Aug. 5, 1947.   R. E. LOWEY ET AL   2,425,067
APPARATUS FOR SEALING CONTAINERS
Filed Aug. 1, 1942   14 Sheets-Sheet 10
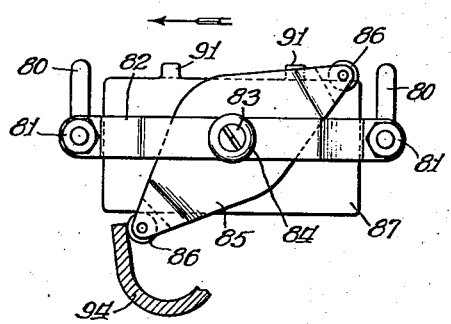
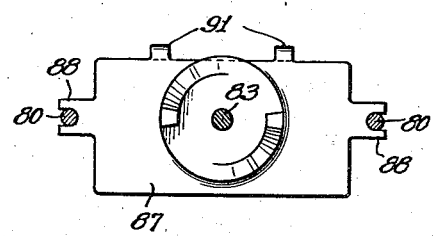
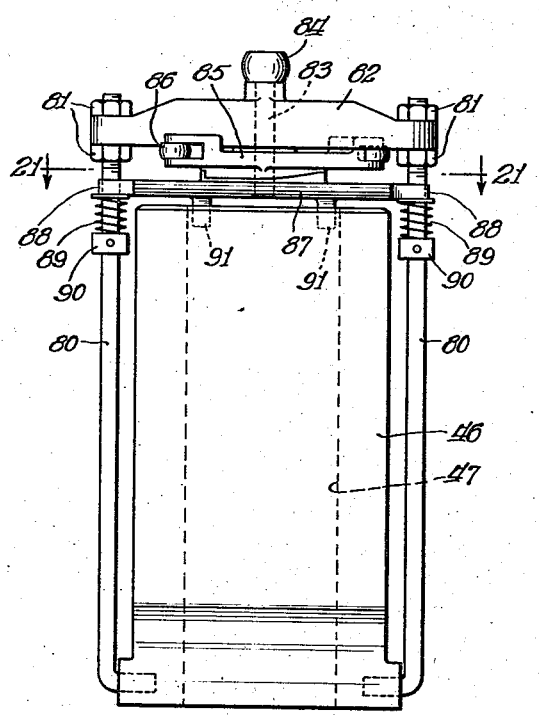
Inventors:
Roy E. Lowey
and
John L. Ferguson
By: C. H. Seeley
Atty.

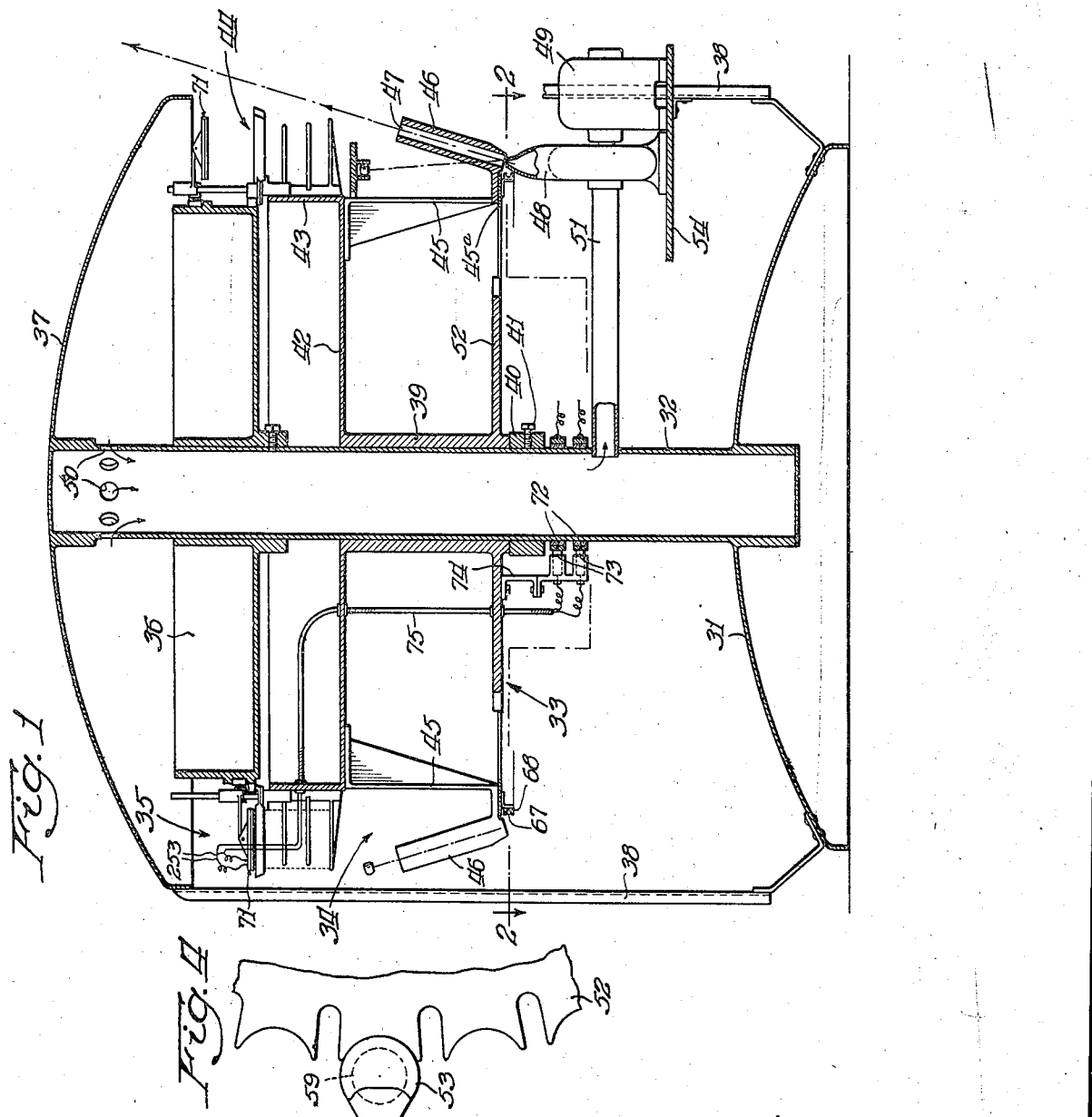

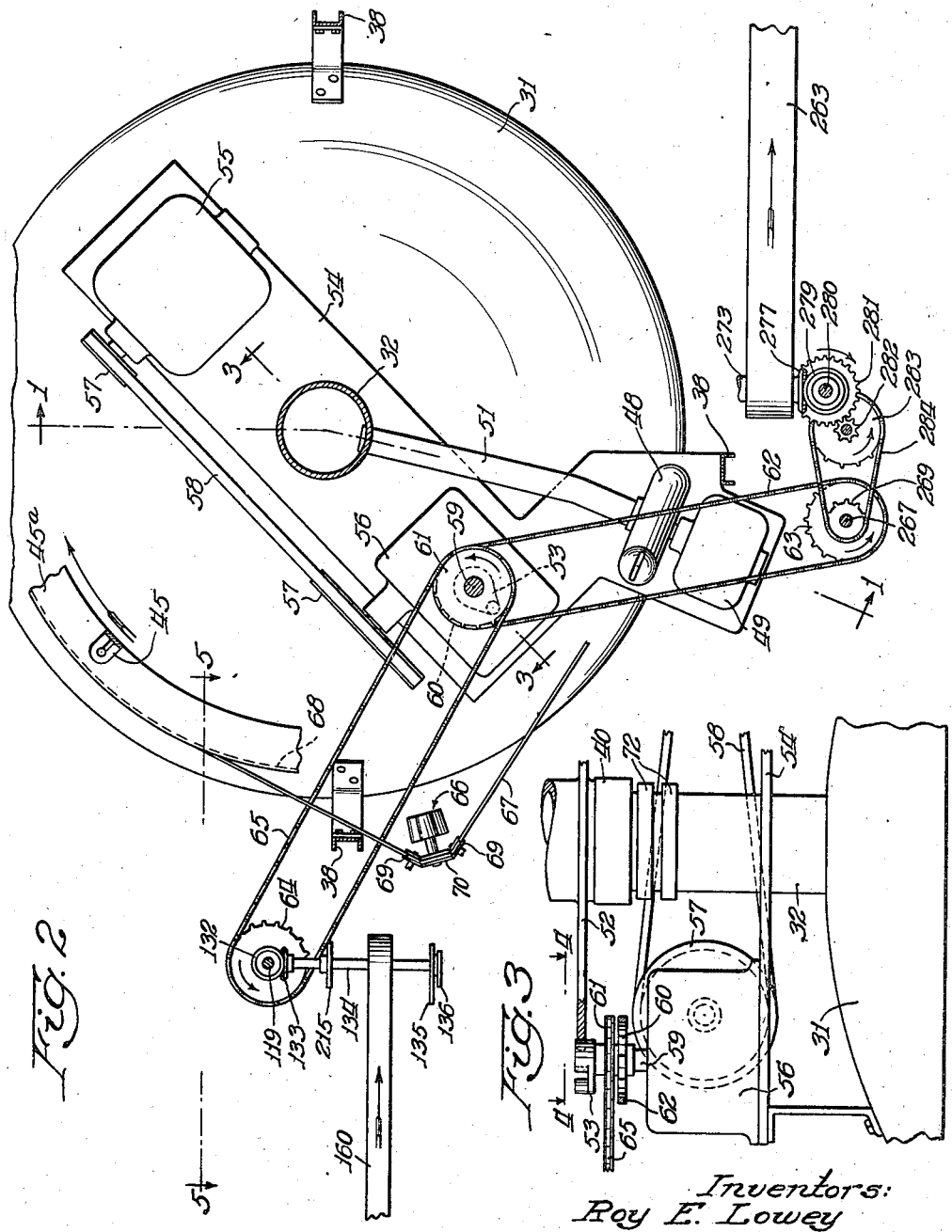

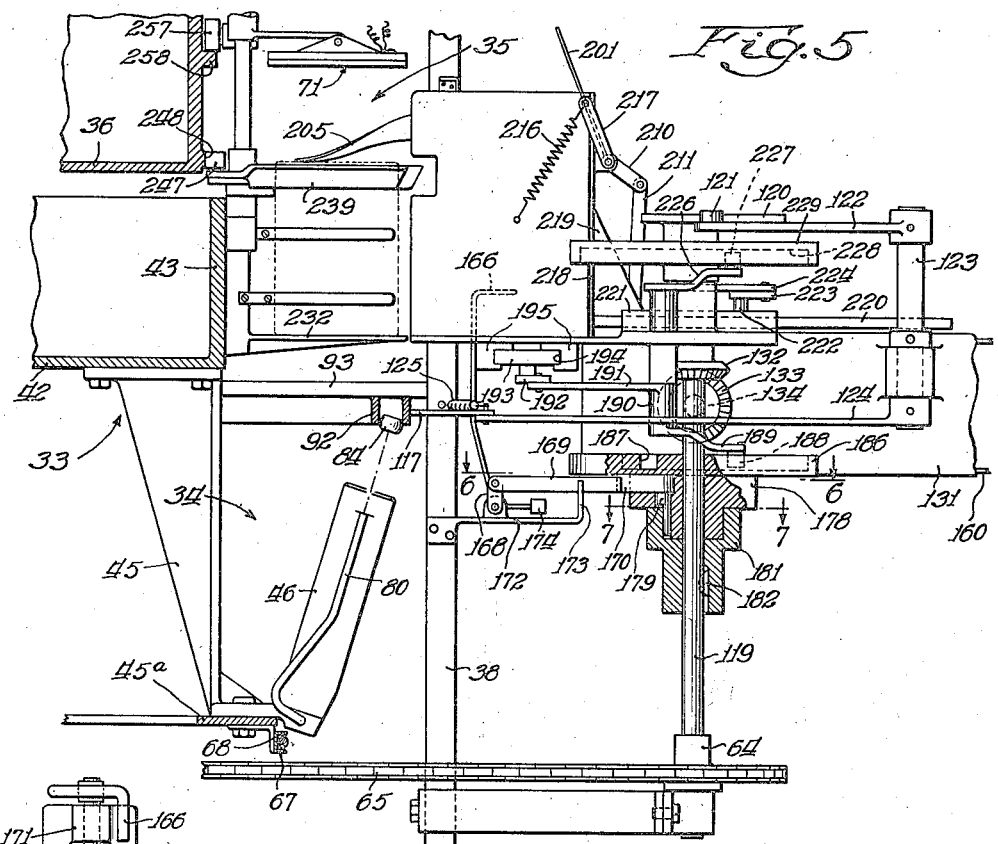
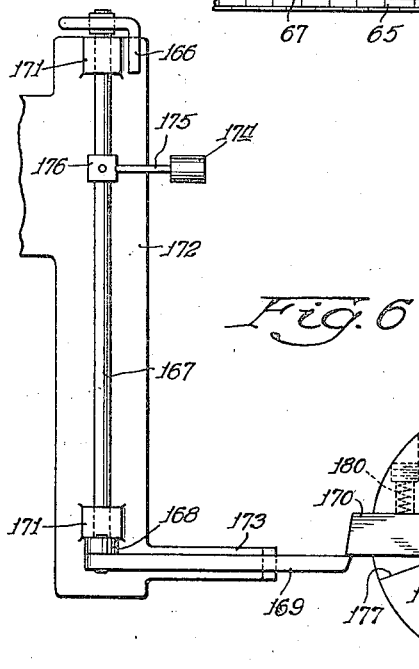
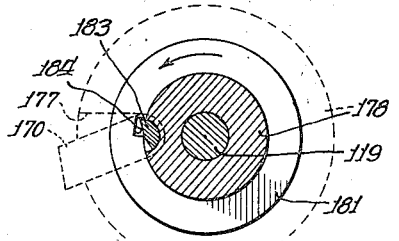

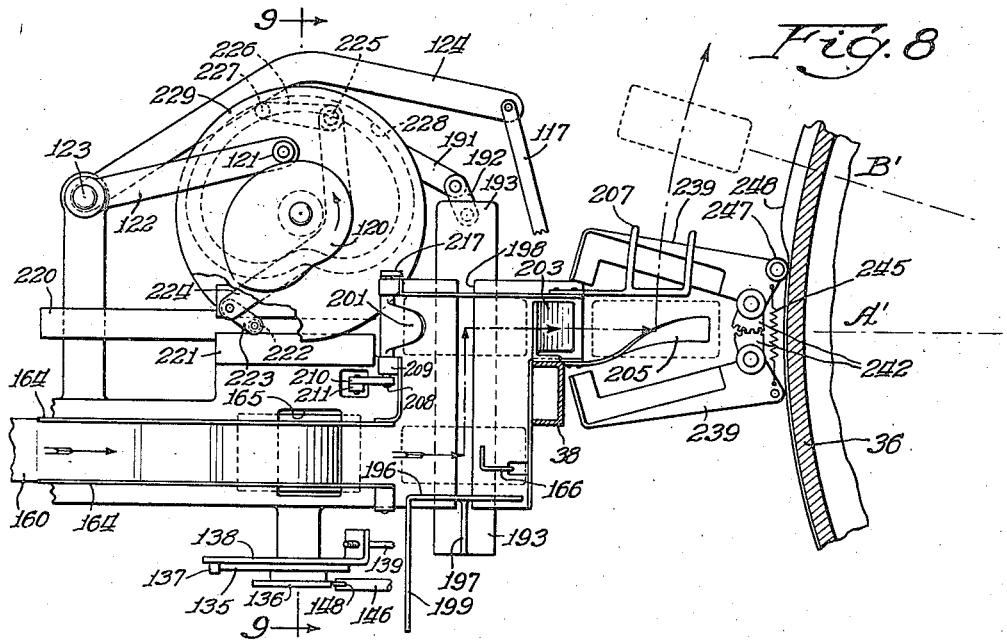

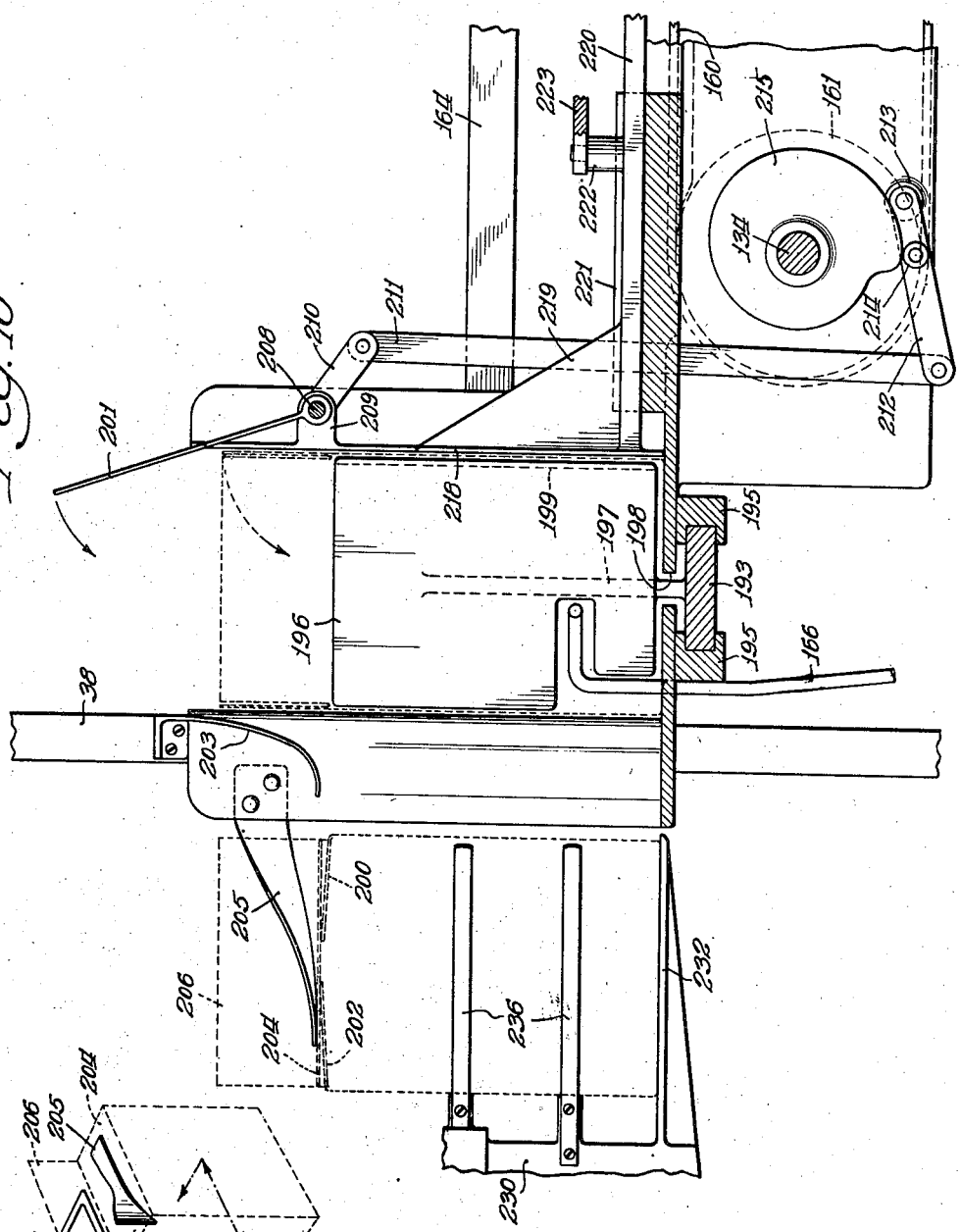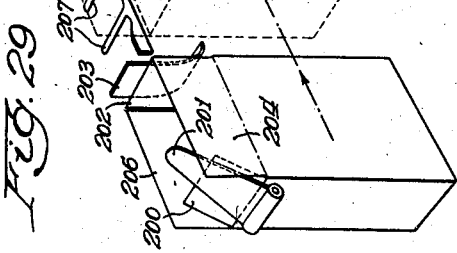

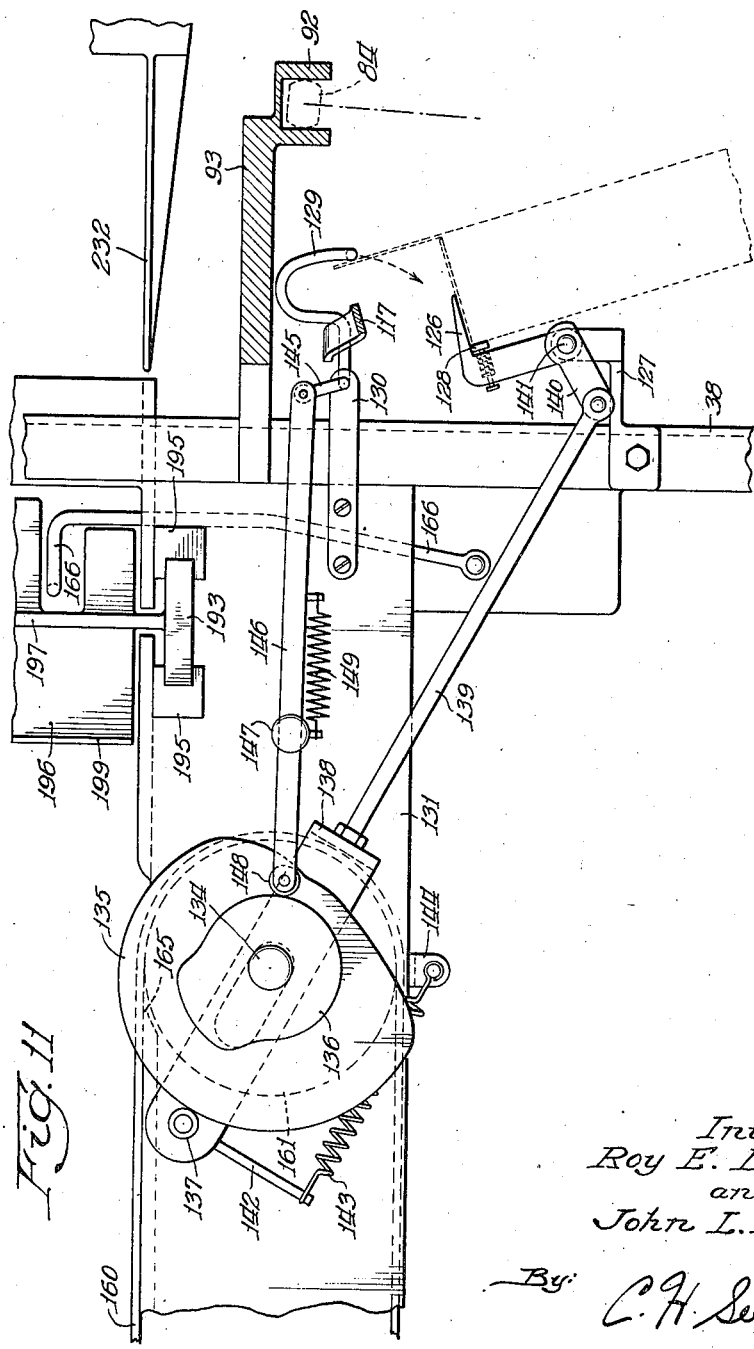

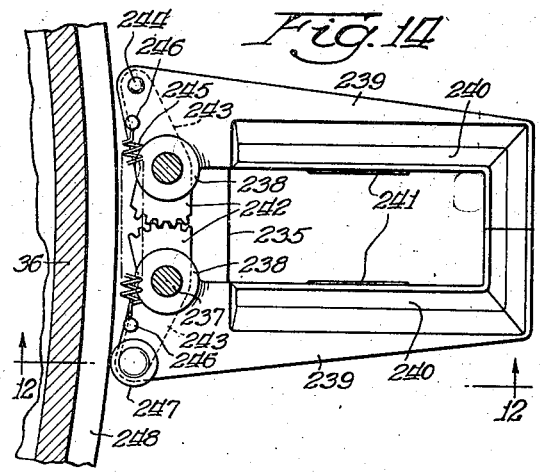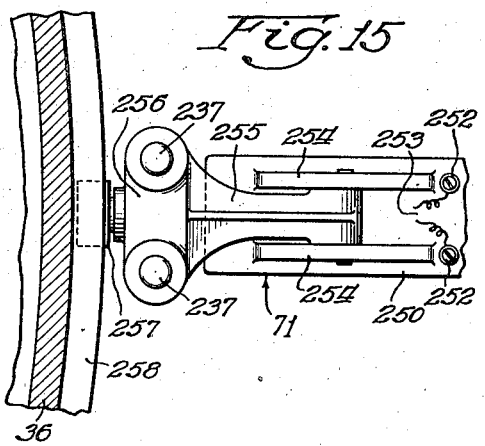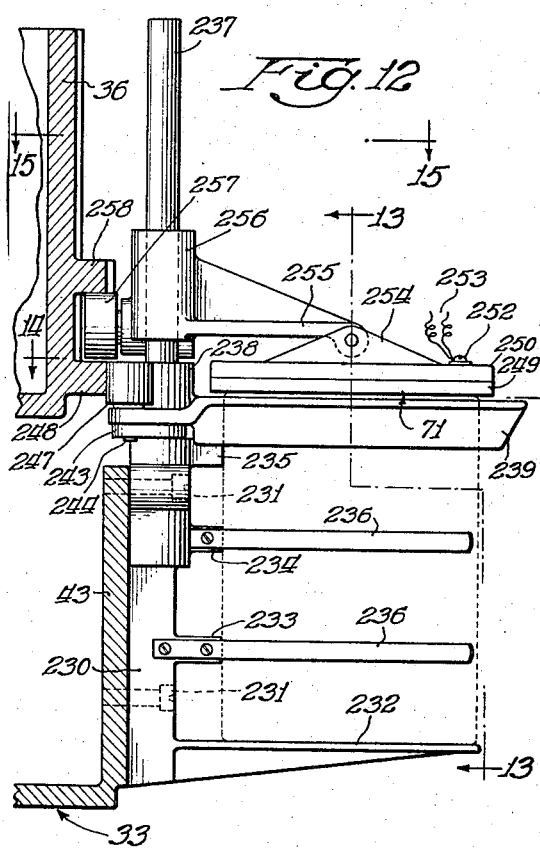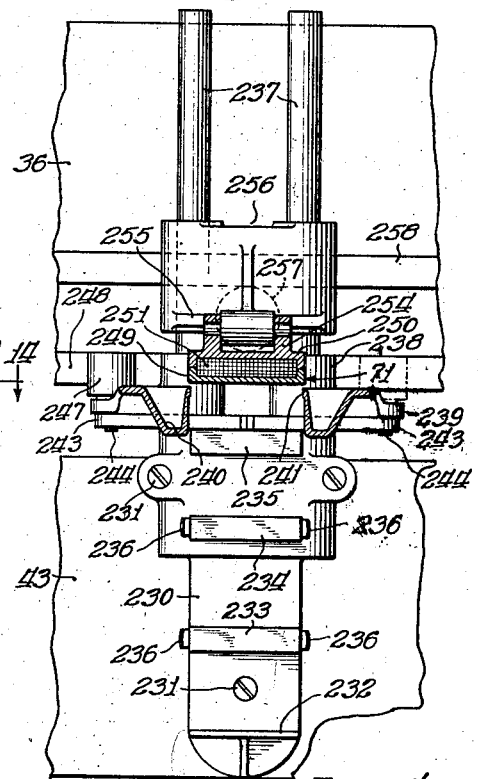

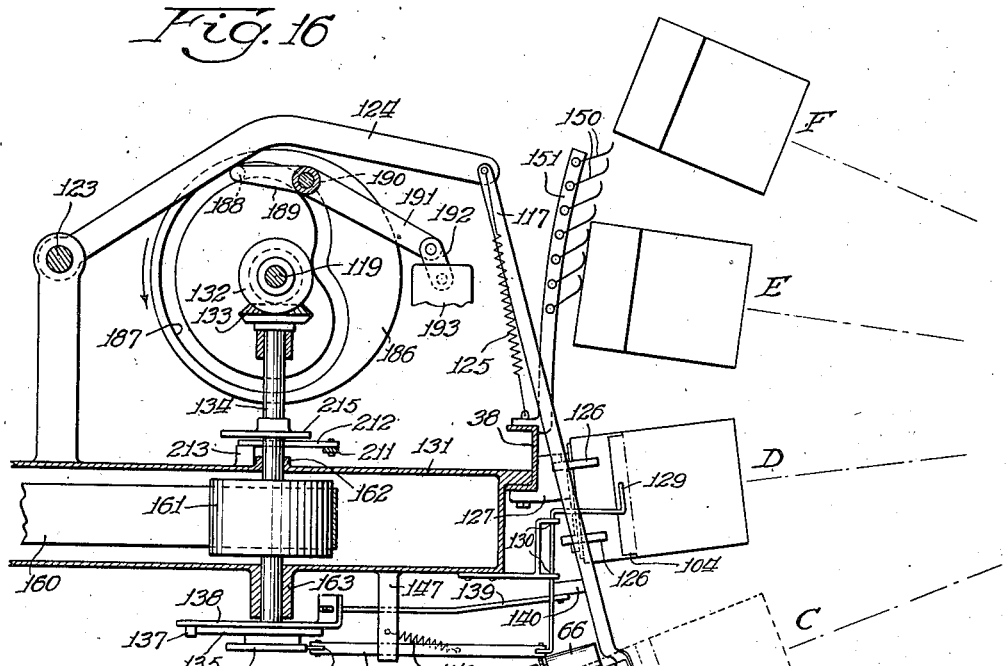

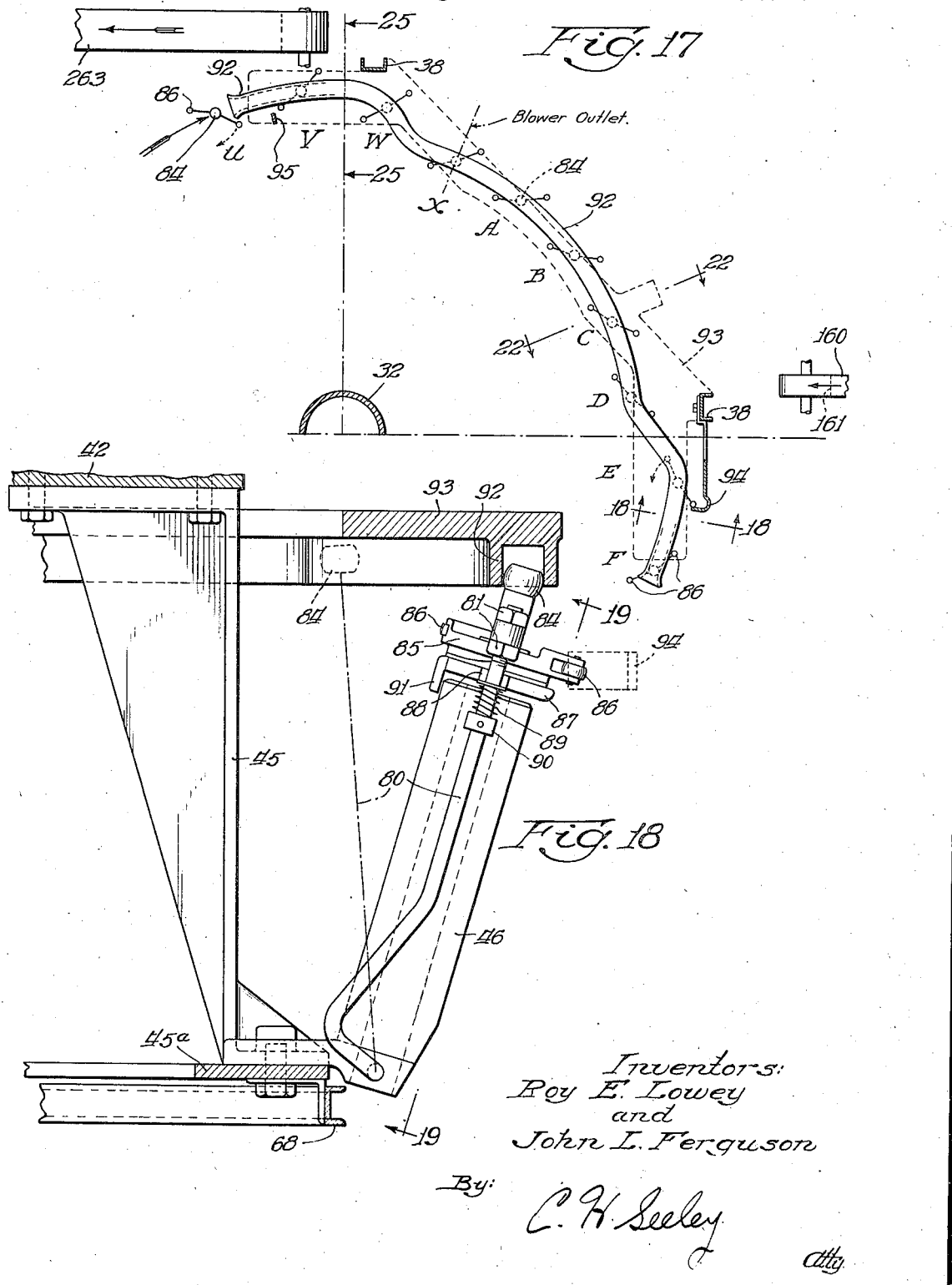

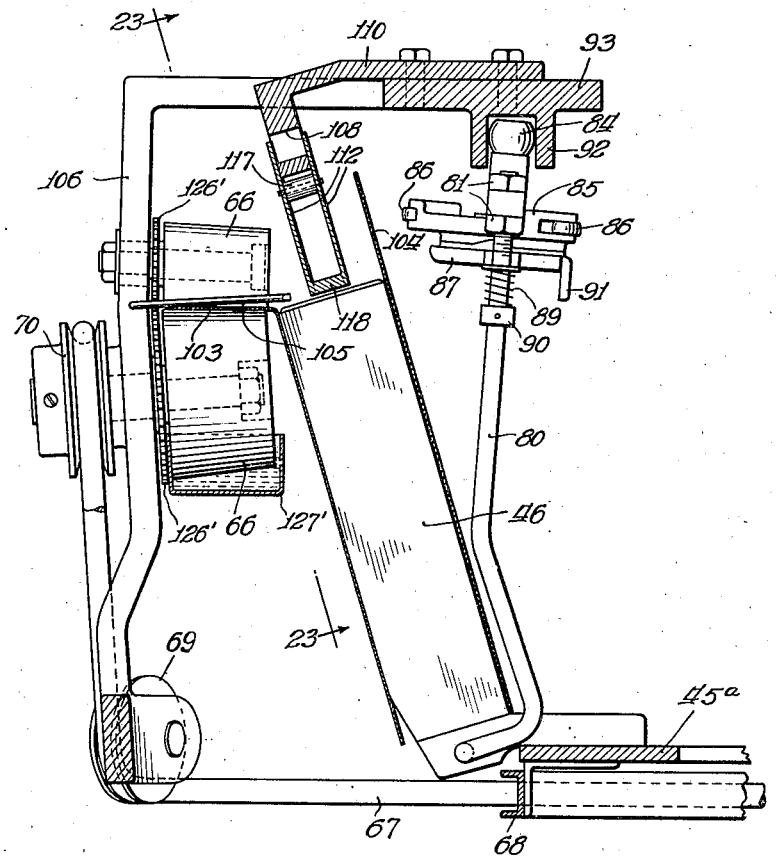

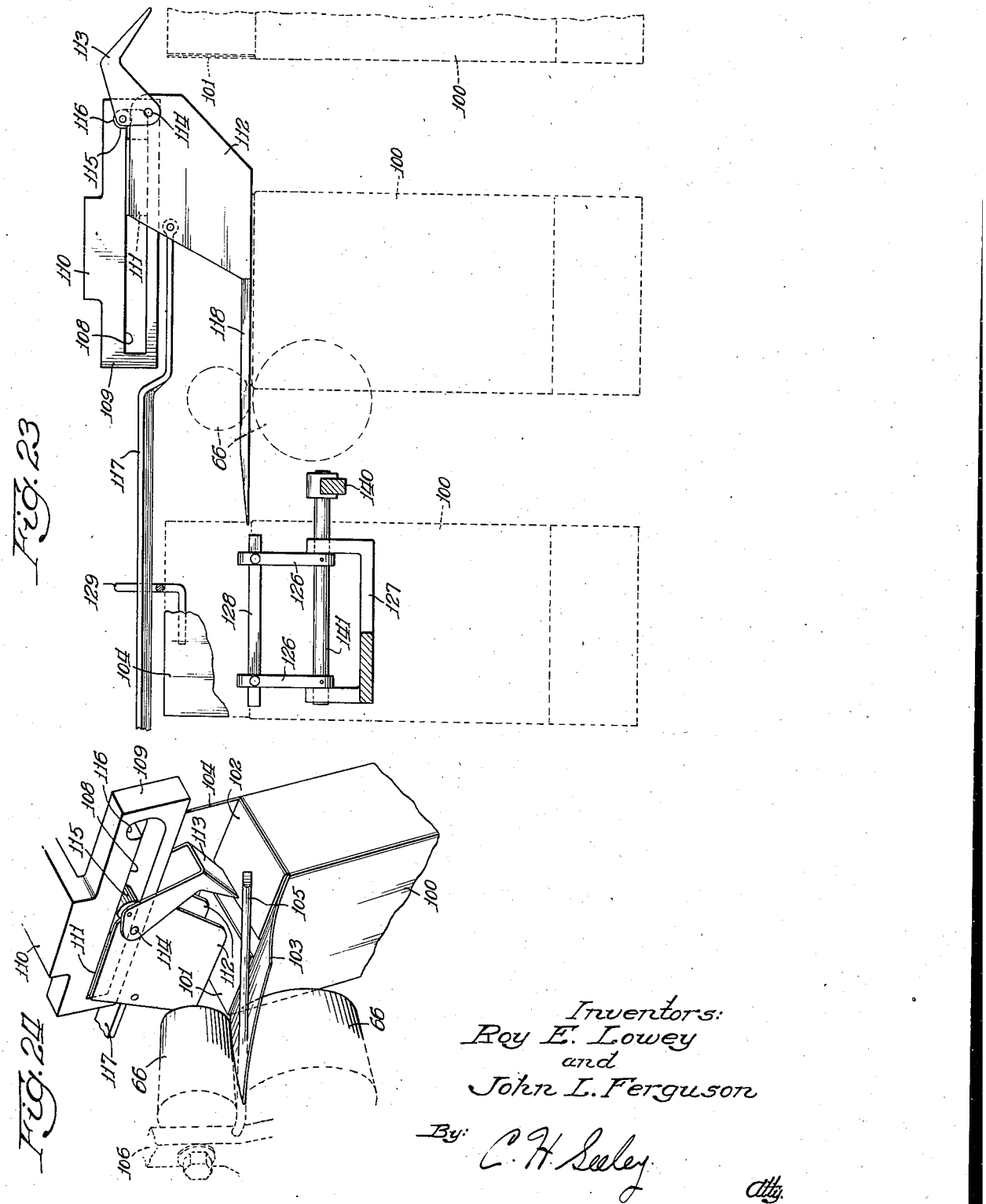

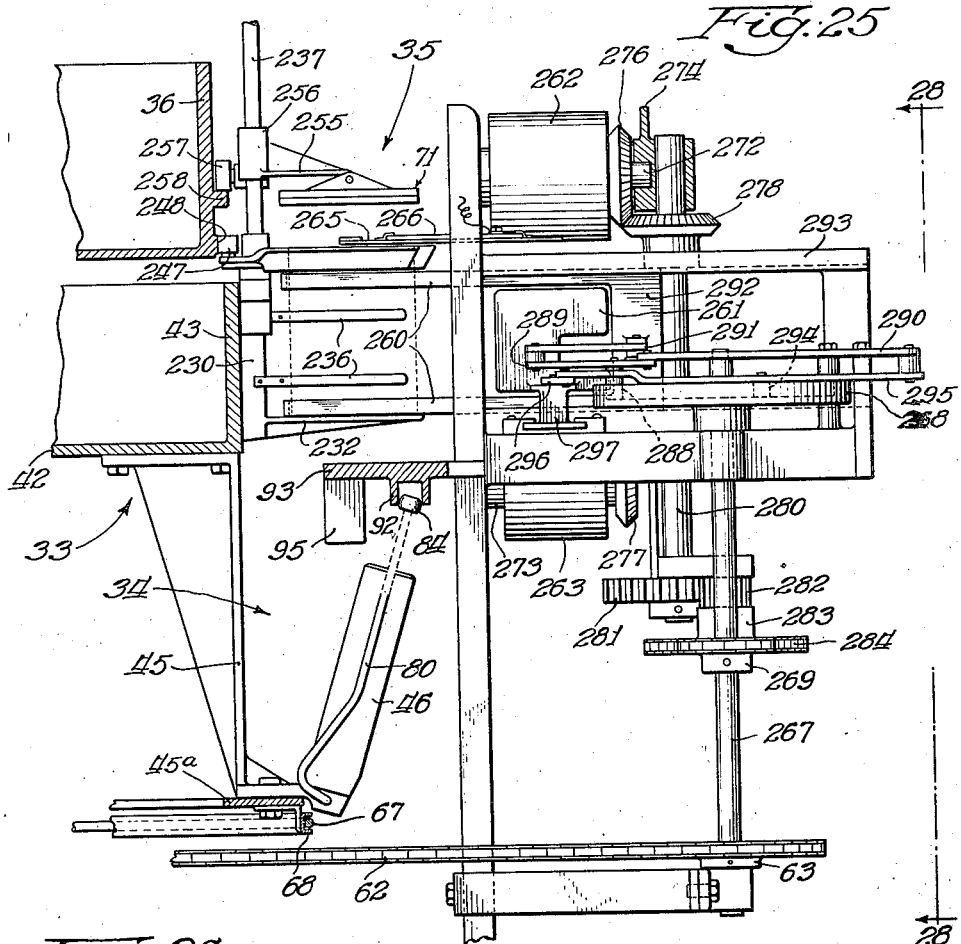
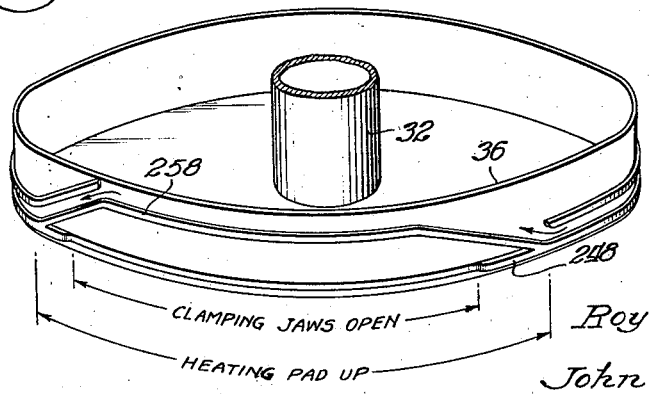

Aug. 5, 1947.   R. E. LOWEY ET AL   2,425,067
APPARATUS FOR SEALING CONTAINERS
Filed Aug. 1, 1942   14 Sheets—Sheet 14
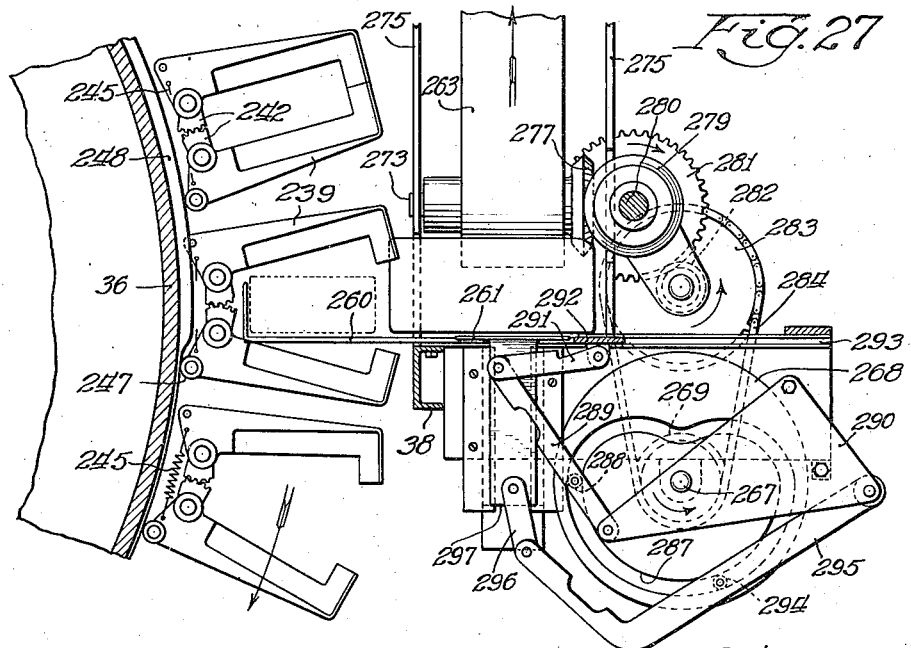
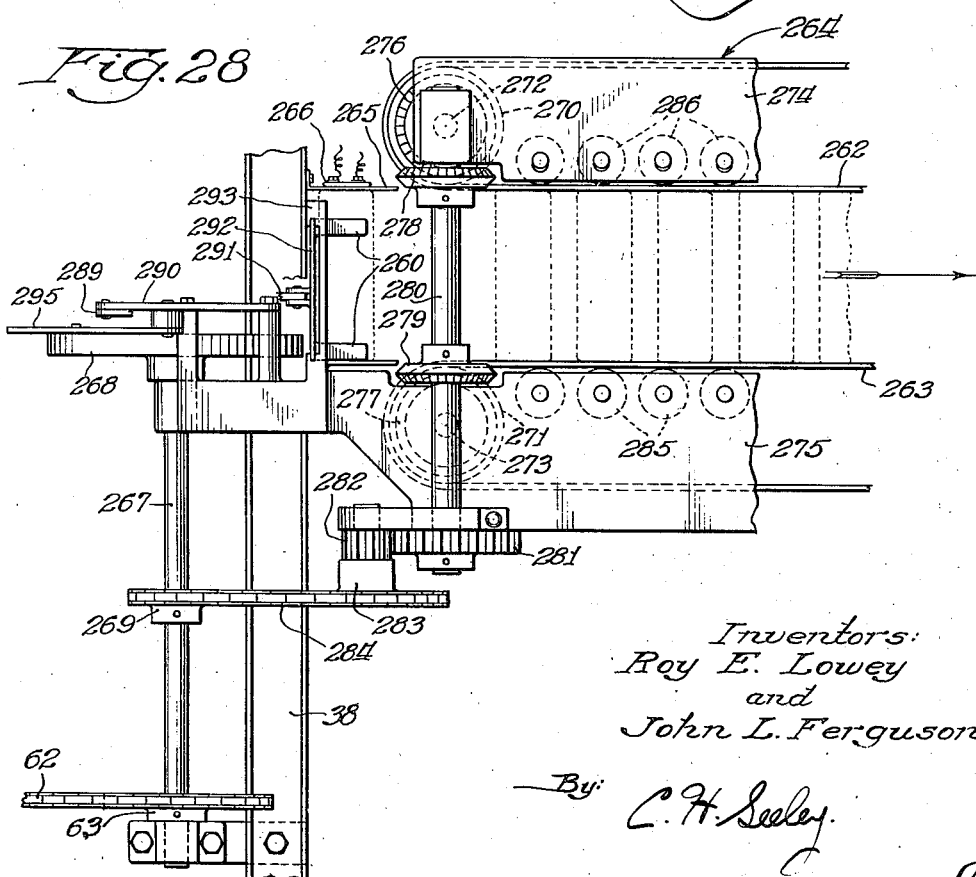
Inventors:
Roy E. Lowey
and
John L. Ferguson
By C. H. Seeley
Atty.

Patented Aug. 5, 1947

2,425,067

UNITED STATES PATENT OFFICE 2,425,067

APPARATUS FOR SEALING CONTAINERS

Roy E. Lowey, Evanston, and John L. Ferguson, Joliet, Ill., assignors, by direct and mesne assignments, to Container Corporation of America, Chicago, Ill., a corporation of Delaware Application August 1, 1942, Serial No. 453,286

4 Claims. (Cl. 93—7)

1

This invention relates to apparatus for sealing containers and more particularly to machines of this type adapted for sealing the top and bottom closure flaps of four-sided, tubular-type cartons having a plurality of closure flaps at each end thereof which are adapted to be folded downwardly into overlapping position and sealed together.

One object of the present invention is to provide a compact, unitary form of sealing machine in which the same driving means and supporting framework are employed for sealing both ends of the carton so that it can work in cooperation with another machine or machines for filling the cartons with desired products.

Another object of the invention is to provide efficient mechanism for receiving an expanded tubular carton, closing its bottom flaps by suitable adhesive and retaining the bottom flaps in contact until the adhesive is set; removing the bottom-sealed cartons from the machine and conveying them to a desired point, as for example, to a carton-coating machine where the cartons can be coated with a continuous film of a thermoplastic coating composition; receiving cartons that have been coated on both inside and outside surfaces with a thermoplastic coating composition and have been subsequently filled with the proper amount of the product which it is desired to maintain as nearly as possible in a hermetically-sealed condition; so handling the unsealed cartons that the top flaps will be accurately folded down into flat, overlapping relation and maintained in such relation while thermoplastic material on said flaps is softened; then allowing the thermoplastic material to cool to cause adherence between the flaps; collecting any excess thermoplastic material that has escaped from between the overlapping flaps; and finally, after the cartons have been effectively sealed, removing them from the machine.

Other and more specific objects of the invention will become apparent upon reading the specification which follows in conjunction with the drawings.

In the drawings, which illustrate a preferred embodiment of the present invention:

Fig. 1 is a cross-sectional view in elevation being taken substantially along line 1—1 of Fig. 2, illustrating the principal frame work of the machine and also illustrating certain essential operating parts such as the holding elements for filled and sealed cartons and the blower mechanism for removing bottom-sealed cartons from the machine;

Fig. 2 is a horizontal cross-sectional view of the machine substantially along line 2—2 of Fig. 1, illustrating principally the means for rotating the turret and for driving the conveyors feeding cartons to and taking cartons away from the machine;

Fig. 3 is an enlarged fragmentary detail view taken along line 3—3 of Fig. 2 illustrating mechanism by which the rotating turret is rotated in a step-by-step motion;

Fig. 4 is a fragmentary detail view of the gearing for producing the step-by-step motion illustrated in Fig. 3;

Fig. 5 is an enlarged elevational view taken substantially along the line 5—5 of Fig. 2, illustrating the controlling parts for properly delivering filled cartons to the turret member preparatory to sealing such cartons;

Fig. 6 is an enlarged fragmentary detail view taken substantially along line 6—6 of Fig. 5 illustrating the intermittently operating devices actuated by the presence of a carton in position to be transferred to the turret;

Fig. 7 is a fragmentary detail view taken along line 7—7 of Fig. 5;

Fig. 8 is an enlarged fragmentary top view illustrating the mechanism, also shown in Fig. 5, for bringing filled cartons into the machine preparatory to sealing the top flaps thereof;

Fig. 9 is a fragmentary vertical sectional view taken along line 9—9 of Fig. 8, looking in the direction of the arrows showing another view of the filled-carton feeding mechanism;

Fig. 10 is an enlarged fragmentary sectional view taken substantially along line 10—10 of Fig. 9 looking in the direction of the arrows and illustrating the mechanism and controls for folding down three top flaps of the carton;

Fig. 11 is an enlarged fragmentary detail view taken partly in section along line 11—11 of Fig. 9 looking in the direction of the arrows and illustrating the mechanism for folding down and holding in temporary position the first three flaps on an empty carton;

Fig. 12 is a fragmentary detail sectional view taken along line 12—12 of Fig. 14, illustrating the manner of mounting one of the heating elements arranged to contact the top flap of a filled carton while in closed position so as to soften the thermoplastic adhesive material with which the carton is preferably coated prior to being filled with the desired commodity;

Fig. 13 is a fragmentary detail sectional view taken along line 13—13 of Fig. 12 looking in the direction of the arrows, illustrating a combined means for applying pressure against the sides of the filled carton adjacent the top edges and for collecting excess thermoplastic material that might be squeezed out from between the flaps and might otherwise run down the sides of the carton;

Fig. 14 is a fragmentary detail sectional view taken along line 14—14 of Fig. 12, illustrating the mounting of the combined pressure-applying and excess thermoplastic-collecting elements;

Fig. 15 is a sectional detail view taken along line 15—15 of Fig. 12, illustrating one of the elements for applying heat to the top of the carton and the manner of mounting this element on the machine;

Fig. 16 is a fragmentary detail sectional view, illustrating particularly the flap-folding element and its control for folding downwardly the underlying flaps of an empty carton on both the forward and the trailing side edges thereof preparatory to sealing the bottom of an empty carton while same is in an inverted position and also showing how such parts are coordinated in movement with the means for handling filled cartons;

Fig. 17 is a fragmentary detail view, illustrating the progressive positions of the mechanism for handling empty cartons, holding the bottom flaps of empty cartons in sealed position and later removing the cartons from the handling means;

Fig. 18 is a fragmentary detail sectional view taken along line 18—18 of Fig. 17 looking in the direction of the arrow illustrating one of the elements for holding an empty carton in an inverted position so that the adhesive between the closure flaps is allowed to set, preparatory to ejecting the empty bottom-sealed carton from the machine;

Fig. 19 is a fragmentary detail sectional view, taken along line 19—19 of Fig. 18, illustrating the holding mechanism for the empty bottom-sealed carton as it appears when looking toward the center of the machine;

Fig. 20 is a fragmentary top plan view of the element illustrated in Fig. 19;

Fig. 21 is a fragmentary sectional view taken along line 21—21 of Fig. 19;

Fig. 22 is a fragmentary detail sectional view taken along line 22—22 of Fig. 17, illustrating the glue rolls in the process of applying adhesive to one of the bottom flaps of the carton;

Fig. 23 is a fragmentary detail sectional view taken along line 23—23 of Fig. 22 showing the positional relationship between the folding-down mechanism for the underlying flaps and the glue rolls for applying adhesive to both sides of a side flap which is to be disposed between the underlying flaps and the other side flap;

Fig. 24 is a fragmentary detail perspective view showing the mechanism as it appears just after the underlying flaps have been folded down and just prior to the passage of one of the side flaps in between the glue rolls;

Fig. 25 is a fragmentary detail sectional view taken along line 25—25 of Fig. 17, illustrating the relationship between the upper and lower parts of the machine in which the empty cartons are bottom-sealed on one level and the filled cartons are top-sealed on another level, and also showing details of the filled and sealed carton ejecting mechanism for removing cartons from the revolving turret;

Fig. 26 is a fragmentary detail perspective view, illustrating the master control cam, having cam tracks thereon for effecting proper movement of the heating plate and clamping jaws for sealing the top flaps of a filled carton;

Fig. 27 is a fragmentary detail plan view of certain of the parts illustrated in Fig. 25, showing the mechanism for ejecting filled and completely sealed cartons from the machine turret after the clamping jaws have been opened;

Fig. 28 is a fragmentary detail sectional view taken along line 28—28 of Fig. 25 looking in the direction of the arrow, illustrating the top and bottom conveying belts for conveying away from the machine the filled and completely sealed cartons and the arrangement of the conveyor belts with respect to the ejecting mechanism;

Fig. 29 is a perspective view, illustrating the construction of the down-folding mechanism for the top flaps of a filled container but without showing any of the controls for such mechanism; and Fig. 30 is a perspective view, illustrating the construction of the elements for folding down the bottom flaps of an empty carton while same is in an inverted position.

The machine of the present invention has particular adaptability in packing operations for the packaging of fresh fruits, vegetables, fish and the like products which are intended for sale in frozen condition, although it is also applicable to the packaging of cereals and many other products, especially those which are subject to deterioration through change in moisture content. A principal feature of the machine is that it is adapted to seal such products in cartons which have been completely coated with a suitable thermoplastic material so that they will be retained therein without necessitating any additional wrappers, liners or special boards, the use of which increases the cost of packing. Suitable cartons can be first bottom-sealed with ordinary glue adhesive on the machine of the present invention, can afterward be coated both inside and out with suitable thermoplastic coating material by means of equipment not herein illustrated, and then, after the coated cartons have been filled, this machine will receive the cartons, close their top flaps, soften the thermoplastic material with which the top flaps are coated, exert sufficient pressure on the top flaps while they are retained in flat, overlapping relation to cause the thermoplastic material to flow and to fill the cracks and crevices between and adjacent to them, collect any excess thermoplastic material forced from between the flaps which would otherwise render the carton unsightly, cool the sealed cartons, and finally, after they have been cooled, discharge them preparatory to packing in shipping containers for distribution to the market.

Referring more particularly to the drawings, and especially to Figure 1 thereof, the machine of the present invention includes a base 31, a vertical hollow center column 32 supported by the base 31, and a turret indicated generally at 33 mounted for rotation on column 32, turret 33 consisting of a lower section 34 used in sealing the bottom flaps of empty cartons, and an upper section 35 which is adapted to heat seal cartons which have been coated with thermoplastic material and filled with the product being packaged. Immediately above the upper section 35 is a stationary element 36 axially mounted on shaft 32 and having a circular flange provided with cams for controlling the motion of the heat-sealing elements as will be described below. A top or cover member 37 rests on the upper portion of column 32 and is additionally supported at its edges by a plurality of vertical posts 38 secured to the base 31, which in this instance, are sections of steel having a channel cross-section.

The turret 33 has a hub portion 39 which fits closely around shaft 32 and which is supported at the desired elevation by thrust bearing collar 40 attached to the shaft by means of cap screw 41. Extended outwardly from the upper end of hub 39 is a horizontal disc 42 having around its circumference an upstanding flange 43 which supports a plurality of heat-sealing units, which are generally designated at 44. In the present instance, there are twenty-four such heat-sealing units spaced equally around flange 43. Depending from disc 42 is a second ring-like support 45 having equally spaced around its lower edge twenty-four blocks 46, which are forms over which the empty tubular cartons are placed for the bottom-sealing operation. These blocks 46 are inclined outwardly at a small acute angle to the vertical and are located between the heat-sealing assemblies 44 so that the bottom-sealed cartons may be blown off the blocks 46 as indicated in Figure 1. For this reason each of the blocks 46 has an air channel 47 and air is forced therethrough by means of blower 48 driven by motor 49. Since the heat-sealing operation causes a certain amount of fumes to be emitted, it is desirable to ventilate the air space beneath the cover 37 and air from this space is drawn through the holes 50 in the upper portion of column 32 into the interior thereof and thence through pipe 51 to the blower 48. By this means, both ventilation and carton blow-off are accomplished at the same time.

In this machine the movement of the turret is an indexed movement which rotates the turret 33 in a clock-wise direction a definite number of degrees, in this case 15 degrees, and then causes it to rest or dwell for a definite period of time while certain of the operations to be described takes place. This movement is created by Geneva gears, the driven gear 52 extending horizontally from the lower part of hub 39. The circumference of gear 52 has a configuration best seen in Figure 4, which figure also illustrates the manner in which it cooperates with the driving Geneva pinion 53. Figure 2 illustrates the mechanism for driving pinion 53 and also the arrangements for actuating the conveyors used to supply cartons to and remove them from the top-sealing portion of the machine. A horizontal platform 54 is provided immediately above base 31, upon which are mounted not only blower 48 and motor 49 but also a second motor 55 and a gear-type speed reducer 56 driven by motor 55 by means of pulleys 57 and belt 58. Extending vertically from speed reducer 56 and best seen in Figure 3 is a shaft 59 carrying sprockets 60 and 61 and at its upper end the driving pinion 53 of the Geneva movement. The sprocket 60 cooperates with chain 62 to drive sprocket 63 and this in turn operates the mechanism for removing sealed cartons from the machine as will be described in detail below, and similarly sprocket 61 drives sprocket 64 by means of chain 65 and this in turn controls operations in connection with the folding of the flaps of cartons in both the upper and lower sections and the entrance of the cartons to the upper section. It will be noted that all of these operations are driven by the same prime mover and that they can, therefore, be accurately timed with respect to the movement of the turret, regardless of the speed of operation.

Figures 1 and 2 also illustrate the means used for driving the glue rolls 66 for applying glue to one of the bottom flaps of the cartons on the lower section. This is done by means of a belt 67, or the like, extending around a suitable, large sectional pulley 68 attached to the lower portion of element 45, thence under idler pulleys 69 and up and over pulley 70 which is on the same shaft as glue roll 66. In Figure 1 is also shown the arrangement for supplying heating current to the heat-sealing plates 71 associated with the top-sealing units 44. This is accomplished by supplying current to a pair of slip rings 72 mounted on but insulated from column 32, from which a pair of brushes 73 supported by a bracket 74 from the gear 52 picks it up and supplies it to cable 75 extending in the vicinity of one of the heat-sealing units 44, as will readily be understood by those skilled in the art. This current can easily be supplied to the heating device associated with each of the heat-sealing units 44 from that point, such as by a double loop arrangement, so that it is deemed unnecessary to illustrate this feature.

The detailed construction of the bottom-sealing mechanism and its mode of operation will now be described: As already pointed out, the lower section 34 is provided with a plurality of blocks 46 at regularly spaced intervals about the periphery thereof. One of these forms and its associated equipment are illustrated in Figures 18 to 21, to which reference is now made. Figure 18 is a side view of one of the blocks 46 which is securely bolted to or otherwise carried by support 45 at a small angle from the vertical. Each of the blocks 46 has a rod or bail 80 mounted on each side thereof which is pivoted at its lower end for backward and forward swinging movement and threaded at its upper end for the reception of nuts 81 which hold a cross head 82 in the desired position over the top of block 46. Cross head 82 is provided axially with a bore hole for reception of a shaft 83, at the upper end of which is mounted a cam roller 84, the purpose of which is to cooperate with the cam track 92 (Figure 18) in a manner which will be described below. Also mounted on shaft 83 immediately below cross head 82 is a somewhat elongated rotatable compression jaw 85 bearing cam rollers 86 at its extremities and having a downwardly facing cam surface of the inclined plane type which cooperates with a similar upwardly facing cam surface on compression pad 87. Pad 87 has substantially the same dimensions as the bottom of the cartons to be sealed and is provided with lateral projections 88 having grooves therein so that it is adapted to slide upon bails 80 although it is urged in a generally upward direction by means of pad lift springs 89 bearing on collars 90 secured to bails 80 at the desired point. The cam surfaces associated with members 85 and 87 are so arranged that when jaw 85 is in the position shown in Figures 19 and 20, pad 87 is urged upwardly and out of contact with the top of block 46 while rotation of jaw 85 in a counter-clockwise direction through an angle of somewhat less than 180° will cause the pad 87 to be forced downwardly against the top of block 46 and held in that position. Pad 87 is also provided at its inner edge with two depending extensions 91 for the purpose of holding the rear edge of the carton to be glued so that it will be square.

The cam track 92 which controls the forward and backward swinging movement of bails 80 and the flap-holding apparatus just described is inverted U-shape in cross section and is mounted on the lower side of cam track support 93, which has the configuration indicated in dotted lines on Figure 17 and is in turn supported by two of the vertical channel iron posts 38 already mentioned. The shape of cam track 92 as seen from above is indicated in Figure 17 and it will be noted therefrom that at the positions designated A to D inclusive, this track is relatively close to the axis of rotation while at positions E and F it is relatively distant therefrom. In other words, those bottom-sealing units in positions A to D, inclusive, have their flap-holding assemblies swung back from the blocks 46 associated therewith into the position generally indicated by the dot-and-dash line on Figure 18, while between positions D and E the bails 80 and the assembly carried thereby are swung into operative position in axial alignment with the blocks 46. As the turret moves and a given unit passes from position E to position F, the outermost of the cam rollers 86 is engaged with the stationary locking cam 94 secured to post 38 and the compression jaw 85 is rotated in a counter-clockwise direction, thus clamping pad 87 against flaps of a carton on block 46 which have previously been folded and to which adhesive has been applied in a manner to be described.

Following this clamping step, pad 87 remains under pressure while the block 46 passes successively through positions F, G, H, etc., until position U is reached and the roller 84 is about to enter the other end of the cam track 92. As it moves to position V, the inner of the cam rollers 86 comes in contact with the unlocking cam 95 projecting downwardly from cam track support 93 and jaw 85 is moved in a clockwise direction, whereby pad 87 is released from the flaps of the carton on block 46. Between position V and position W the flap-holding assembly on bails 80 is started back to its retracted position and in position X is completely out of the way so that the blower 48 shown in Figure 1 can by forcing a stream of air through the opening 47 in block 46 cause the completely bottom-sealed carton to be automatically blown off into a conveying tube (not shown), thus allowing the next position A to be used for the placing of another empty tubular carton to be bottom-sealed over block 46.

As stated in the preceding paragraph, position A is the one in which the cartons are placed by hand on the blocks 46. In the machine now being described by way of example, the construction of these blocks is such that they are adapted to receive tubular cartons of the form illustrated at 100 in Figure 30, and they are placed upon the blocks with their bottom flaps extending in a generally upward and outward direction. Each of the cartons 100 is provided with a leading end wall flap 101, a trailing end wall flap 102, an outer side wall flap 103 and an inner side wall flap 104. As the turret 33 moves so that the carton passes from position A to position B, no operations are performed on any of these flaps; but upon movement from position B to position C, three separate operations are carried out: namely, (1) the flap 101 is folded down into its final position; (2) flap 102 is folded down into a corresponding position; and (3) the flap 103 is urged outwardly into a position such that it is ready to pass between the glue rolls 66, which are adapted to apply adhesive to both sides thereof. This last operation is achieved by means of a guide rod 105 attached to the glue roll support bracket 106, as best shown in Figure 16, although it also appears on Figures 22 and 24.

The other operations are carried out by means of a more or less conventional type of folding device illustrated generally at 107 on Figure 30, but best shown in Figures 22, 23 and 24. The operative parts of the folding device 107 are mounted in a slot 108 in the depending portion 109 of an appropriate bracket 110 secured at its upper end to the cam track support 93. The moving folding mechanism includes a small block 111 adapted to slide to and fro within the slot 108, block 111 having a depending plate 112 secured to each side thereof, the edges of the plates 112, which first come in contact with the flap 101, being appropriately rounded off as shown in Figure 23. A flap-tucking member 113 is swingably mounted on an axis 114 on plates 112 and this tucker 113 also carries between its side parts a roller 115 which is adapted to roll within the slot 108 and when the entire device is in its usual rest position, to enter an upwardly extending portion 116 of slot 108 so that tucker 113 is raised to the position shown in Figure 23. This is the position in which the flap-folding device just described remains during the time that the turret is being maintained at one of the fixed positions in its cycle. When turret 33 moves, however, so that a block 46 and the carton supported thereby passes from position B to position C, the flap 101 of this carton first engages the edges of plates 112 so that it is folded into the desired position. Immediately thereafter, and still during the transition period, the plates 112 and all of the movable apparatus associated therewith is moved to the left as shown on Figure 23 by means of rod 117, whereby tucker 113 is caused to swing downwardly upon the outer edge of flap 102, as shown in the middle portion of Figure 30, so that it also is tucked beneath the lower edges of plates 112. This condition persists until position C has been reached and the rod 117 is moved in the opposite direction so that the operation can be repeated on the next carton. Bar 118 is secured at one end to plates 112 in substantially horizontal position so that the flaps 101 and 102 will remain in their folded position after the folding apparatus has returned to its original condition and also serves to hold them in shape from position C to position D as will be described below.

Obviously, the motion of rod 117 must be timed precisely with the motion of the turret and this is accomplished by means of an appropriate cam arrangement driven from sprocket 64, which has already been described. Referring now to Figure 5, it will be seen that sprocket 64 drives a vertical shaft 119 and thus a cam 120 which is mounted on the extreme upper end of shaft 119, the outer contour of cam 120 being shown in Figure 8. The contour of cam 120 is followed by roller 121 on an arm 122 which is in turn mounted on a vertical cam shaft 123. Also mounted on shaft 123 at the lower end thereof is an arm 124 which is connected to the end of rod 117 as shown in Figures 5, 8 and 16. It will be apparent that the rod 117 will be moved to cause the flap-folding mechanism to operate whenever the roller 121 is forced away from the axis of shaft 119 by the edge of cam 120, and the reverse of this motion is caused to occur by means of tension spring 125 having one end secured to post 38 and the other to the juncture of rod 117 and arm 124 as shown on Figure 16. It will be seen from the above that in position C the end wall flaps 101 and 102 have been folded down and the side wall flap 103 folded outwardly for passage through the glue rolls.

During the passage from position C to position D, the only operation which takes place is the application of adhesive to flap 103 and this is done in a conventional manner as shown in Figures 16, 22 and 24. The upper and lower glue rolls 66 are mounted for rotation on glue roll support 106 secured to cam track support 93, the lower glue roll 66 being driven by pulley 70 by means of belt 67 from member 68 supported on the turret 33. The glue rolls 66 are, of course, caused to rotate simultaneously by the meshing of the gears 126 associated with each and the glue to replace that used is fed to glue pot 127 in which the lower glue roll 66 continuously rotates by conventional means (not shown).

During the time the carton remains at position D, as shown on Figure 16, the folding of the side wall flaps 103 and 104 takes place. Since flap 103 has been coated with glue on both sides by passage between the glue rolls, this flap is first folded upon the flaps 101 and 103 which have been held in position by rod 118. This folding operation is carried out by means of a pair of fingers 126 which are pivotally mounted on bracket 127 attached to post 38. This operation is illustrated in simplified form at the left-hand portion of Figure 30 which shows the shape of the fingers 126 and the horizontal bar 128 mounted upon them, which comes in contact with the outer side wall of the carton along the upper edge thereof so as to assist in making a square corner. Immediately thereafter, flap 104 is folded over upon flap 103 by means of a rod 129 mounted on pivots 130 which are in turn secured to the supporting member 131. As the rod 129 moves downwardly, and before it reaches the end of its travel, fingers 126 are moved back out of the way so that full contact between flaps 103 and 104 can be obtained. Obviously, these operations must be timed accurately with respect to the turret motion so that these elements 126 and 129 are also actuated by vertical shaft 119.

As shown in Figure 5, a bevel gear 132 is mounted upon shaft 119 and this in turn drives bevel gear 133 mounted on horizontal shaft 134, at the other end of which are two cam elements 135 and 136. The contour of cam elements 135 and 136 can best be seen in Figure 11. Cooperating with the periphery of cam 135 is a roller 137 mounted adjacent one end of an elongated member 138 having a slot therein, through which shaft 134 extends. The other end of member 138 is secured to a rod 139 connected by link 140 to the shaft 141 upon which fingers 126 are mounted. Adjacent roller 137, member 138 is provided with an extension 142, upon which a coil spring 143 attached at its other end to a bracket 144 on member 131 exerts a force urging roller 137 against the surface of cam 135 at all times. It will be seen that the arrangement is such that member 138 and rod 139 are maintained in the position shown with fingers 126 bearing upon the top of flap 103 during a part of the cycle, but that when the cutaway portion of the cam surface is reached, these members will be caused, by the tension in spring 143, to move generally downward and to the right and fingers 126 will then be swung out of contact with the carton being sealed. It will also be seen from Figure 11 that the mounting of bar 128 on fingers 126 is adjustable for various conditions. Another view of the fingers 126 and associated parts is shown in Figure 23.

The operation of rod 129 can best be seen in Figures 11 and 16, from which it will be apparent that rod 129 has an upwardly extending part 145 rotatably attached at its end to one end of a push rod 146 which is slidably mounted in a bracket 147 extending from member 131. The other end of rod 146 bears a roller 148, which is in contact with the periphery of cam 136 at all times due to the tension in spring 149. It will be apparent that this arrangement is such that during most of the cycle, rod 129 is in its raised position and that when it is desired to fold flap 104, cam 136 causes rod 146 to move to the right and rod 129 is thereupon caused to swing downwardly so as to fold flap 104.

As the carton under consideration moves from position D to position E, it will be seen from Figure 17 that the cam track 92 curves outwardly, thus causing the entire flap-folding mechanism previously described mounted on bails 80 to move to a position in axial alignment with the block 46 upon which the carton is mounted, and that this action takes place with sufficient rapidity so that the folded flaps approximately retain their positions. Then, as previously described, upon motion from position E to position F, one of the cam rollers 86 comes in contact with the locking cam 94 and the depending portion 91 of pad 87 squares up the inner upper edge of the carton. Also, as will be seen from Figure 16, the outer upper edge of the carton is squared up at the same time by means of a plurality of spring fingers 150 mounted on a support 151 secured to channel iron post 38.

By the arrangement hereinabove described, the flaps constituting the bottom of each carton being passed through the operation are properly folded, glued and held in the proper arrangement with square corners and are so held by compression pad 87 for a time sufficient to allow the adhesive to set. The remainder of the bottom-sealing step has already been brought out, but briefly stated, it consists of the raising of pad 87 between positions U and V by contact of one of the rollers 86 with unlocking cam 95, the swinging back of the flap-holding mechanism between positions V and X and the blowing-off of the bottom-sealed cartons at position X as best illustrated in Figure 1.

As already stated, the present machine is particularly adapted for use in connection with a process involving the coating of the bottom-sealed cartons with a suitable thermoplastic composition such as one having particularly good moisture vapor-proofing properties, filling the coated cartons with the product to be packed and then top-sealing the filled cartons. The coating and filling operations can be carried out by any suitable means and form no part of the present invention. The top-sealing operation, however, is also performed on the present machine, an important advantage thereof being that the bottom-sealing and top-sealing operations take place at exactly the same rate, thereby assisting in keeping the entire packaging line moving at the desired rate of production.

The thermoplastic-coated filled cartons are introduced into the top-sealing section by means of a belt or chain conveyor 160 which is driven by shaft 134 and, hence, ultimately by prime mover 55 as already described and as illustrated generally in Figure 2. This is shown in more detail in Figure 16 which shows the pulley 161 mounted on shaft 134, over which the conveyor belt 160 is disposed. It will be understood, of course, that there is a similar pulley, not shown, at the other end of the conveyor which is suitably supported. Shaft 134 is mounted for rotation in suitable bearings 162 and 163 formed in the sides of supporting member 131 which is a substantially horizontal inverted channel iron section secured at one end to vertical post 38 and at the other to suitable supporting means. This construction is shown in cross-section in Figure 9, which also illustrates the carton guide strips 164 which hold the cartons in line moving in the direction of one of their narrow panels along with the conveyor. In order that the pulley 161 may receive the conveyor belt 160 moving along the upper face of channel 131, a hole 165 is provided as shown in Figure 8. From that point on, the cartons are moved by means of the pressure exerted on them by the following cartons until they come in contact with a trip member 166, which, when actuated by the presence of a carton, starts the carton through the entrance mechanism to one of the top-sealing stations on the turret.

It is apparent that the entrance mechanism must be timed with the turret motion so that if a carton has not come in contact with trip 166 by the time a certain portion of the cycle has been reached, it will be withheld until the proper portion of the next cycle is reached. Referring now to Figures 5 and 6, when trip member 166 is moved to the left by an entering carton, this causes shaft 167 to move so that link 168 is also moved to the left and the bar 169 hingedly attached to the end thereof is drawn back out of contact with the clutch latch 170. Shaft 167 is mounted on suitable bearings 171 attached to a supporting member 172 which also includes an extension 173 for slidably supporting arm 169, the whole being rigidly secured to vertical channel member 38. Also, this entire device is urged by weight 174 which is held in fixed position with respect to shaft 167 by arm 175 and collar 176 into a position of readiness to be actuated by a carton passing from conveyor belt 130. Clutch latch 170 is free to rotate through a small angle in a slot 177 in the upper face of a rotatable member 178 axially mounted on shaft 119 but not directly driven thereby. The axis of rotation of latch 170 is determined by a depending pin-like portion 179 which cooperates with a corresponding hole in member 178. Furthermore, latch 170 is gently urged by means of spring 180 in counter-clockwise direction, although when it is in contact with rod 169, it assumes the position shown in Figure 6 against the action of spring 180. Member 178 is held in position by the immediately underlying collar member 181 which is keyed to shaft 119 by means of key 182. Pin 179 has a depending portion 183 having a cross-section as shown in Figure 7 consisting of a sector of less than 180°. When latch 170 is in the position shown in Figure 6, there is no connection between members 178 and 181 and the latter rotates while the former remains stationary. When a carton has actuated trip member 166, however, and latch 170 is urged to the position shown in Figure 7, the depending member 183 is free to enter the slot 184 provided in the upper portion of member 181 whereby members 178 and 181 are caused to move in synchronism through one complete revolution. Obviously, if slot 184 is not in the proper position for member 183 to enter it, there will be a delay until such time as the cooperating relationship appears. When member 178 is thus caused to rotate, this motion is transmitted through the upstanding pins 185 to the immediately overlying cam plate 186, which contains in its upper surface cam slots for the purpose of controlling the mechanism forcing the carton which actuated the trip member 166 into the entrance mechanism. The contour of the cam slot 187 in cam plate 186 is followed by a roller 188 at one end of an arm 189 which extends from a sleeve 190 mounted for rotation about a vertical axis. Another arm 191 also extends from sleeve 190 and through link 192 is adapted to actuate the slide member 193 which is mounted for reciprocating horizontal motion in grooves 194 in plates 195 which have their upper surfaces substantially in line with the bottom of the cartons entering the mechanism. At the other end of the slide member 193 is mounted the carton-pushing device which consists essentially, as will be observed from Figures 8, 9, 10 and 11, of a vertical plate 196 having a cut-out portion to avoid interference with the trip member 166 adapted to come in contact with the side wall of the entering carton secured to member 193 by means of a vertical web 197 at right angles to both of these elements and adapted to operate in the slot 198 separating the plates 195. A second vertical plate 199 extends at right angles from plate 196 so as to prevent additional cartons from entering the space behind plate 196 when the latter is in operation. From the above, it will be apparent that an efficient mechanism has been provided for timing precisely the moment at which each carton begins its travel through the flap-folding devices to be described and into the top-sealing mechanism.

The path followed by the cartons to be top-sealed is shown by the arrows in Figure 8, and it will be apparent therefrom that the entrance mechanism has been described for placing filled cartons successively and at a predetermined point in the cycle in position to be moved directly into one of the heat-sealing units 44. Certain flap-folding operations, however, are carried out during this motion, and one of them, viz., the folding of the trailing end wall flap is initiated just before this motion begins. The relationship of these operations is illustrated in simplified form in Figure 29, which shows how the trailing end wall flap 200 is folded down by tongue 201, leading end wall flap 202 is folded down as the carton moves under the curved strip 203, underlying side wall flap 204 is folded over flaps 200 and 202 by curved strip 205, and, finally, side wall flap 206 is folded upon flap 204 by member 207 as the station in which the carton has been inserted moves to the next position by reason of the motion of the turret. The first three of these steps can best be observed from Figures 8, 9 and 10.

Tongue 201 is swingably mounted on a shaft 208 working in bearing supports 209 so that it is adapted to fold flap 200 when moved downwardly as already described. The required motion is achieved by means of arm 210 on one end of shaft 208 linked to a rod 211 which is substantially vertical and which is actuated by one end of lever 212. Lever 212 is swingably mounted at its other end on a bearing 213 extending from supporting member 131 (see also Figure 16) and carries at an intermediate point a roller 214 working on the cam 215 mounted on shaft 134. Tongue 201 is normally urged to its downward position by means of spring 216 (Figure 5) cooperating with arm 217 also mounted on shaft 208, so that roller 214 and lever 212 will always move in accordance with the cam 215. Tongue 201 therefore, swings down at the desired moment in synchronism with the cycle of turret 33 since shaft 134 is so synchronized as already described.

Immediately after tongue 201 has completed its downward motion and before it starts to return to its normal position, the carton is started on its travel into one of the heat-sealing units on the turret 33. This is achieved by the pushing action of vertical plate 218 which is supported by web member 219 and mounted on a slide member 220 working in an appropriate groove in block 221. The motion of plate 218 is also synchronized with the cycle of turret 33 by means of a linkage consisting of the short vertical member 222 mounted on slide member 220, link 223, arm 224 mounted to swing on shaft 225, a second arm 226, also mounted on shaft 225 in constant angular relationship to arm 224, and roller 227 on the other end of arm 226 which cooperates with and follows the contour of a suitable cam groove 228 in the lower surface of cam member 229 mounted on shaft 119. Since shaft 119 is synchronized with turret 33 as hereinabove described, the movement of plate 218 and the carton urged by it is arranged so that the carton enters one of the top-sealing stations while the latter is stationary and ready to receive it. During this travel, however, the flaps 202 and 204 are automatically folded as described by devices 203 and 205 which are mounted on the supporting structure associated with post 38 as clearly brought out in Figures 8 and 10.

The construction of the heat-sealing units will next be described. One of these is shown in Figures 5 and 8 and the details thereof in Figures 12, 13, 14 and 15. Each includes a generally elongated main supporting member 230 which is firmly secured to the peripheral flange 43 of turret 33, e. g. by cap screws 231, in an upright position, and which has an outwardly extending platform section 232 at its lower end to support the bottom of cartons to be top-sealed and three vertically spaced projections 233, 234 and 235 adapted to present end surfaces to the inwardly facing end walls of such cartons so as to limit the extent of movement thereof toward the axis of turret rotation. The lowermost pair of these projections are provided at each side with support fingers 236 serving to guide an entering carton into the proper position and to assist in holding it against lateral movement, while the uppermost projection 235 has an upwardly extending portion having its upper edge at about the level of the innermost upper edge of the carton being sealed.

Extending upwardly from supporting member 230 and symmetrically placed with respect to the longitudinal axis thereof are two shafts or guides 237 which are circular in cross-section and upon which are two bearing members 238 having extending therefrom swingably mounted the two collar sections 239 which are adapted to cooperate so as to grip firmly the carton to be sealed substantially around its upper edge. Each of the collar sections includes an appropriate groove or drip trough 240 in its upper face for the reception of excess thermoplastic coating material which may be squeezed from between the top flaps during the heat-sealing operation and also a small projection 241 adapted to deflect the upper portion of the carton side walls slightly inwardly when the collar is in closed position so that underlying carton flaps will be unable to move beyond the horizontal and will be subject to the pressure of the sealing unit whereby a better top seal is obtained. Immediately below bearings 238 and also adapted to swing on shafts 237 are gear sectors 242 which extend toward and engage one another and which have substantially oppositely extending arms 243 secured to the overlying collar sections 239 by pins 244 or the like. By this arrangement the collar sections 239 are caused to open and close simultaneously and to the same extent, but they are urged to the open position by means of spring 245 acting on pins 246 whereby a carton may be inserted between them through the opening separating their outer ends. This open position is seen in Figure 8, which also shows the relationship of the top-sealing station to the carton entrance mechanism when the former is dwelling in the position at which the filled cartons are received.

When this station is moved from position $A^1$ as shown in Figure 8 to the next position indicated as position $B^1$, the collar sections 239 are closed by the action of the roller 247 mounted on the leading collar section 239 on the hill-and-dale type cam 248, which extends around the periphery of the stationary element 36. In some instances it may be desirable to provide a similar roller on the other of the collar sections 239 as shown in Figure 13 so the forces holding them in closed position may be equal during a large part of the cycle. This movement also causes the only flap previously unfolded to be swung down into position overlying the others, this being achieved by means of the folding device 207 (Figures 8 and 30).

At the same time the heating element associated with each top-sealing unit starts downward and at position $B^1$ is substantially resting upon the folded top flaps and holds them in position. The heating element itself consists essentially of a lower plate or pad 249 and an upper plate 250 which enclose the electrical heating element 251, current being supplied to the latter by means of insulated terminals 252 and leads 253. Pad 249 has a lower face which is somewhat larger in dimensions than the top of the cartons to be sealed thereby so that sufficient heat will be applied to their upper edges to melt the thermoplastic coating adjacent the top completely, whereby a complete and unbroken film will be formed upon cooling of the thermoplastic material. The heating element is secured by means of upstanding fins 254 on plate 250 to an outwardly extending portion 255 of the bracket 256, which is slidably mounted on guides 237. In this way pad 249 can be made to come in contact with the top of the cartons being sealed and to be raised vertically from this position to one in which it does not interfere with the insertion or removal of cartons from the station associated therewith. The raising and lowering movement is accomplished by means of a roller 257 mounted on the inner portion of bracket 256 which cooperates with a cam track 258 provided on the periphery of stationary element 36.

When a particular top-sealing unit has reached position $A^1$ (Figure 8), the roller 257 rides on the upper surface of cam element 258 which is in such position that the heating unit is in its upper position as shown in Figure 5. Between this position and position $B^1$, however, cam 258 slopes downwardly as shown in Figure 26, so that in the latter position it causes roller 257 to approach its lowest position and the pad 249 to rest on the top of the carton to be sealed. By the time the next position is reached, roller 257 is urged downwardly by the lower surface of cam 258 as shown in Figure 12 so that pressure as well as heat is applied to the top of the cartons to be sealed, and the thermoplastic material on and between the flaps is caused to flow into all of the cracks and crevices between and around them so as to form a continuous film. This condition prevails while turret 33 passes through a considerable number of its angular positions, and then the heating unit is raised and the clamping jaws 239 opened by the reverse action of cams 258 and 248 so that the top-sealed cartons can be removed from the turret. Both of these operations occur in the present machine between positions $R^1$ and $S^1$, that is, between the eighteenth and nineteenth positions, starting with and including the filled carton entrance position.

The exit position, which is 270° from the entrance position, and the carton removal apparatus are shown best in Figures 25, 27 and 28. The general mode of operation of this apparatus is that the cartons are pulled off successive stations by the kickoff fingers 260 and then are pushed by plate 261 into the dryer section which includes upper and lower belts 262 and 263 which come in contact with the top and bottom surfaces of the filled and closed cartons and convey them away from the carton-removing mechanism. It is the purpose of the upper belt 262 to hold the top flaps in closed position until the thermoplastic film thereon has completely solidified, and this action may, if desired, be hastened by blowing relatively cool air on the belt 262 and the cartons thereunder, for instance, by means of a suitable blower, (not shown) associated with the upper belt casing 264. In order that the top flaps may be prevented from becoming dislodged during the transfer of the cartons from the top-sealing section of turret 33 to the dryer section, a stationary flap-holding finger 265 is provided which is preferably heated by electric heater 266.

Obviously all of these movements must be synchronized with the movement of turret 33, and this is accomplished by driving all of the apparatus for carrying them out from chain 62 and sprocket 63, which have already been described in connection with Figure 2. Sprocket 63 is mounted at the lower end of vertical shaft 267, which carries a cam disc 268 adjacent its upper end and sprocket 269 at an intermediate point. Disc 268 operates the kick-off fingers 260 and pusher plate 261 in a manner to be described below while sprocket 269 actuates belts 262 and 263. These belts pass over pulleys 270 and 271 which are mounted on short horizontal shafts 272 and 273 carried by conveyor supports 274 and 275, which shafts also are provided at one side of their respective pulleys with miter gears 276 and 277, respectively. These gears are in turn driven by miter gears 278 and 279, respectively which are synchronized with sprocket 269 by a linkage consisting of vertical shaft 280, gear 281, pinion 282, sprocket 283 and chain 284. The arrangement is such that belts 262 and 263 move at the same speed with the cartons held in upright position between them, pressure being continuously exerted on them by means of a series of lower rollers 285 underlying belt 263 and a series of spring-urged rollers 286 overlying belt 262. This construction is conventional and is therefore not described in detail.

Referring again to cam disc 268, it will be noted that this has a cam groove 287 (Figure 27) in its upper surface in which a pair of rollers operate.

Roller 288 is mounted on the lower side of a lever arm 289 having one end pivoted at one corner of the generally triangular stationary plate 290 and the other end connected through link 291 with the vertical plate 292 from which kick-off fingers 260 project horizontally. Plate 292 and fingers 260 operate in a guide member 293 and the arrangement is such that at the proper moment they are caused to move outwardly to remove a carton from the package pocket and then inwardly to await the arrival of the carton on the next pocket. Roller 294 is mounted on the lower side of another lever arm 295 having one end pivoted at another corner of plate 290 and the other end connected through link 296 with slide member 297 upon the other end of which pusher plate 261 is supported. In this way the cartons delivered by kick-off fingers 260 are pushed shortly thereafter into the dryer section.

It will be obvious that by means of the above-described machine, both bottom-sealing of tubular cartons and top-sealing of the same cartons after coating with a suitable thermoplastic material and filling with the desired product are expeditiously, efficiently and simultaneously carried out, and at the same rate, all with a great saving in floor space. Furthermore, many modifications of the invention as herein specifically disclosed will become apparent to those skilled in the art, so that it is not desired to be limited by the specific arrangements hereinabove described, but only by the scope of the appended claims.

We claim:

1. Apparatus for top-sealing cartons having a thermoplastic sealing compound on the top closure flaps thereof comprising a plurality of carton-receiving stations, means for moving said stations intermittently in a closed path with intervening periods of dwell at predetermined positions, and means for successively introducing cartons into and removing cartons from said stations at certain ones of said positions, each of said stations including means for embracing a carton adjacent the upper edges thereof, means for sealing said top flaps including a heated plate adapted to be lowered into contact with substantially the entire top surface of said carton, and a depressed portion in said embracing means adapted to receive such excess sealing compound as may flow from said top flaps under the influence of said heated plate.

2. Apparatus according to claim 1 wherein said embracing means includes a pair of jaws having a closed position and an open position, means normally urging said jaws to their open position, and positive means for moving said jaws to their closed position against the action of said urging means.

3. Apparatus according to claim 1 wherein said sealing means includes means for moving said heated plate substantially vertically and for applying downward pressure upon said heated plate in its lowered position.

4. Apparatus according to claim 1 wherein said means for moving said stations includes a turret mounted for rotary movement about a vertical axis, said turret having said stations equally spaced upon the periphery thereof.

ROY E. LOWEY.
JOHN L. FERGUSON.

(References on following page)

REFERENCES CITED

The following references are of record in the file of this patent:

UNITED STATES PATENTS

| Number | Name | Date |
|---|---|---|
| 752,369 | Wyman | Feb. 16, 1904 |
| 827,671 | Seales | July 31, 1906 |
| 1,141,156 | Tremaine | June 1, 1915 |
| 785,411 | Doble | Mar. 21, 1905 |
| 2,051,555 | Hartmann | Aug. 18, 1936 |
| 2,114,833 | Fincke | Apr. 19, 1938 |
| 2,212,472 | Hartmann | Aug. 20, 1940 |
| 2,266,054 | Lowey et al. | Dec. 16, 1941 |
| 2,294,275 | Buxbaum | Aug. 25, 1942 |
| 977,097 | Joplin | Nov. 29, 1910 |
| 2,049,876 | Sticelber | Aug. 4, 1936 |
| 2,206,203 | Richard | July 2, 1940 |
| 2,217,784 | Benett et al. | Oct. 15, 1940 |
| 1,118,424 | Johnson | Nov. 24, 1914 |
| 1,530,117 | Hoepner | Mar. 17, 1925 |

FOREIGN PATENTS

| Number | Country | Date |
|---|---|---|
| 114,269 | Australia | Nov. 19, 1941 |
| 20,013 | Great Britain | 1913 |